(12) United States Patent
Beck et al.

(10) Patent No.: US 6,814,248 B2
(45) Date of Patent: Nov. 9, 2004

(54) PLASTICS CONTAINER WITH RECESSED HANDGRIP FEATURES AND ASSOCIATED METHOD AND APPARATUS FOR MANUFACTURE THEREOF

(75) Inventors: Martin H. Beck, Amherst, NH (US); Dennis Connor, Merrimack, NH (US)

(73) Assignee: DTL Technology Limited Partnership, Amherst, NH (US)

( * ) Notice: Subject to any disclaimer, the term of this patent is extended or adjusted under 35 U.S.C. 154(b) by 0 days.

(21) Appl. No.: 10/216,502

(22) Filed: Aug. 8, 2002

(65) Prior Publication Data

US 2004/0026357 A1 Feb. 12, 2004

(51) Int. Cl.[7] .............................................. B65D 23/10
(52) U.S. Cl. ...................... 215/384; 215/279; 215/383; 220/675; 249/58; 425/522
(58) Field of Search .......................... 215/179, 181–184; 220/669, 675; D9/530, 554, 55, 84; 425/522, 525; 249/58

(56) References Cited

U.S. PATENT DOCUMENTS

| | | | | |
|---|---|---|---|---|
| 3,325,031 A | * | 6/1967 | Gregoire et al. ............ | 215/247 |
| D214,874 S | * | 8/1969 | Vanderhyde ................. | D9/542 |
| 5,122,327 A | * | 6/1992 | Spina et al. ................. | 264/534 |
| 5,303,834 A | * | 4/1994 | Krishnakumar et al. .... | 215/381 |
| 5,337,924 A | * | 8/1994 | Dickie ......................... | 222/212 |
| 5,803,290 A | | 9/1998 | Bongiorno .................. | 214/384 |
| 5,868,272 A | * | 2/1999 | Deal ............................ | 220/669 |
| 6,044,996 A | * | 4/2000 | Carew et al. ............... | 215/381 |
| 6,554,146 B1 | * | 4/2003 | DeGroff et al. ............. | 215/381 |

* cited by examiner

*Primary Examiner*—Sue A. Weaver
(74) *Attorney, Agent, or Firm*—Davis & Bujold, P.L.L.C.

(57) ABSTRACT

A handgrip formed in a wall of a plastics container, the wall having an interior, an interior surface, an exterior surface and a wall thickness and suitable for containing a carbonated beverage, including an integral structure formed of a central dome having a convex surface facing toward the adjacent said exterior surface and at least two concentric annular troughs, each having an annular concave surface facing the adjacent said exterior surface, an outer frustum interconnected with each trough and connecting rings, each of curved cross-section having an annular concave surface facing toward the interior, to join, integrally, the frustums to the next outer trough and the outermost frustum to the container wall surrounding the handgrip, the handgrip having a thickness approximately equal to the wall thickness, wherein the handgrip does not extend radially outwardly of the wall. An associated container, blow mold and method are also included.

24 Claims, 8 Drawing Sheets

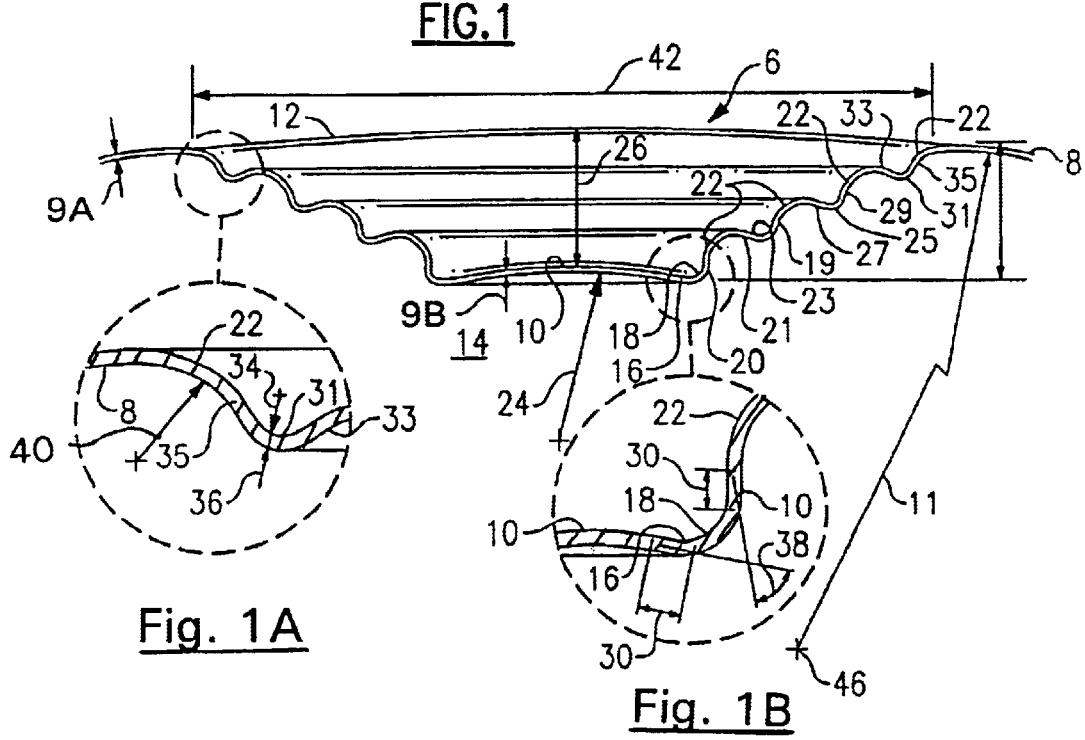
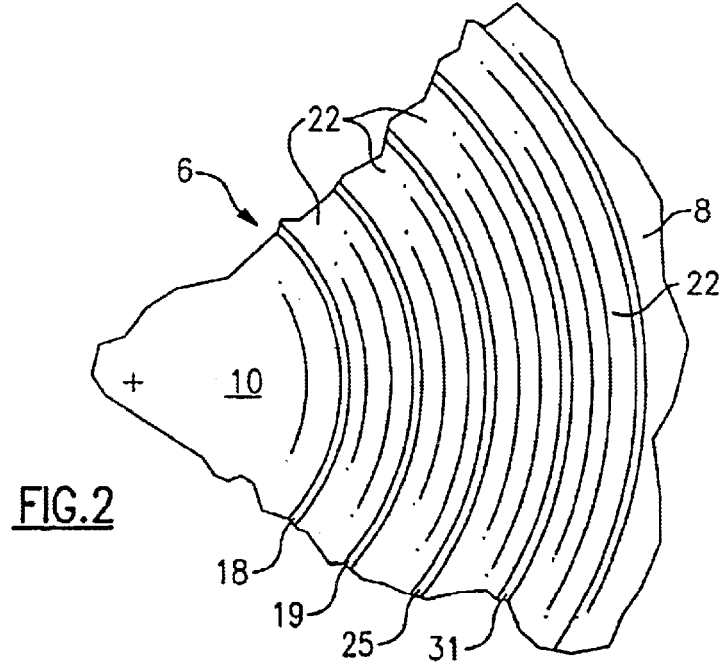

```
┌─────────────────────────────────────────────────────────────┐
│ PROVIDE A BLOW MOLD HAVING HANDGRIP FORMING FEATURE(S) IN THE│
│ FORM OF AT LEAST TWO CONCENTRIC ANNULAR PROJECTIONS TO FORM A│
│ HANDGRIP EXTENDING TOWARD THE AXIS 46 OF THE BLOW MOLD CAVITY│
│ AND THE CONTAINER TO BE FORMED, THE ANNULAR PROJECTIONS HAVING│
│ AN OUTER EXTREMITY AND ADJACENT SIDE SURFACE(S) COMPLIMENTARY│
│ TO THE TROUGHS AND FRUSTUMS OF THE HANDGRIPS.               │
└─────────────────────────────────────────────────────────────┘
                              │
                              ▼
          ┌──────────────────────────────────────┐
          │ PRE-HEAT A PREFORM TO A TEMPERATURE  │
          │ TO FACILITATE BLOW MOLDING TO        │
          │ FORM THE CONTAINER.                  │
          └──────────────────────────────────────┘
                              │
                              ▼
          ┌──────────────────────────────────────┐
          │ INTRODUCE THE PREFORM INTO THE CAVITY│
          │ OF BLOW MOLD                         │
          └──────────────────────────────────────┘
                              │
                              ▼
┌─────────────────────────────────────────────────────────────┐
│ APPLY A GAS AT A SUFFICIENT PRESSURE TO INFLATE AND DEFORM THE│
│ PREFORM INTO CONTACT WITH THE MOLD CAVITY TO FORM THE CONTAINER│
│ AND INTO CONTACT WITH THE COMPLIMENTARY FEATURES TO PRODUCE THE│
│ HANDGRIPS IN THE WALL OF THE CONTAINER, THE HANDGRIPS BEING │
│ FORMED SUBSTANTIALLY FAILING TO CONTACT THE MOLD            │
│ CAVITY IN OTHER REGIONS OF THE HANDGRIPS.                   │
└─────────────────────────────────────────────────────────────┘
                              │
                              ▼
          ┌──────────────────────────────────────┐
          │ COOL THE CONTAINER AND FORMED        │
          │ HANDGRIPS, AND                       │
          └──────────────────────────────────────┘
                              │
                              ▼
          ┌──────────────────────────────────────┐
          │ REMOVE THE CONTAINER WITH HANDGRIPS  │
          │ FORMED THEREIN FROM THE BLOW MOLD CAVITY.│
          └──────────────────────────────────────┘
```

FIG.11

PLASTICS CONTAINER WITH RECESSED HANDGRIP FEATURES AND ASSOCIATED METHOD AND APPARATUS FOR MANUFACTURE THEREOF

FIELD OF THE INVENTION

This invention relates to recessed handgrip features for liquid under pressure e.g. carbonated beverage containers, including bottles, made of a plastics and to methods and apparatus for producing such containers.

DEFINITIONS

"Plastics" are polymerizable materials that can be bi-axially oriented, e.g. polyethylene terephthalate (PET), polypropylene (PP) and acrylonitrile (AN) for use in containers for liquid under pressure, e.g. carbonated beverages.

"PET" as used herein shall be construed as including all materials defined hereinbefore as "Plastics".

"Handgrip" as used herein is a circular feature formed by a deformation of the wall, which includes a shoulder, of a plastics container which does not extend outwardly (relative to the axis of the container) from the outer surface of the container even when the container contains liquid under pressure, e.g. a carbonated beverage, and is exposed to industry defined test procedures for such containers including exposure to stresses resulting from pressure and elevated temperatures during filling, packaging, distribution, sale and the end user actions.

"Circular" as used herein with respect to handgrips shall be construed to include ovals, ellipses, teardrops, circular segments and other rounded shapes as well as circular shapes "Container" as used herein shall be construed to include plastics bottles.

"Frustum" as used herein shall be construed as a truncated hollow right circular cone in which the apex is replaced by a plane section parallel to the cone base and which has parallel inner and outer surfaces and shall be construed to include a hollow cylinder which has parallel inner and outer surfaces.

BACKGROUND OF THE INVENTION

In the past, different designs have been used to make a bottle meet specifications. The typical failure for a bottle is in the grip area or deep contour which will expand (creep) upon pressurization (carbonation) and/or higher than room temperatures. Typical bottle tests call for PET bottles to be pressurized to 4.0 volumes of $CO_2$ (~55 psi at room temperature) and then placed in an oven for 24 hours at 100° F. At this temperature, the gas pressure rises to ~95 psi. In addition to the higher forces applied to the plastic walls, the elastic modulus of the plastic is also slightly lower due to the higher temperature. Due to geometry, the bottles will creep in such a way distorting to the point of eliminating any grip or contour design elements in the sidewall of the bottle.

Some geometric designs will resist the creep and try to retain their original shape, but generally a good percentage of the shape is lost. U.S. Pat. No. 5,803,290 shows one design that claims to hold a significant portion of the shape.

PET for carbonated beverage containers has been used for many years. Many different shapes have been suggested to provide handgrips to easy user handling of these containers.

OBJECTS OF THE INVENTION

An object of the present invention is to provide a plastics container for liquids under pressure, e.g carbonated liquid beverages having stable handgrip features, in a wall thereof, which do not extend outwardly from that wall.

A further object of the present invention is to provide a blow mold design for producing a blow molded plastics container having stable handgrip features, in a wall thereof, which do not extend outwardly from that wall.

Another object of the present invention to provide a method of producing a plastics container having stable handgrip features, in a wall thereof, which do not extend outwardly from that wall.

SUMMARY OF THE INVENTION

According to the invention there is provided a handgrip formed in a wall of a plastics container, the wall defining an interior of the container, an interior surface, an exterior surface and a wall thickness and being suitable for containing a carbonated beverage, comprising an integral structure formed of a central dome having a convex surface facing an adjacent portion of the exterior surface, at least two concentric rings each having an annular concave surface facing the interior, at least two annular troughs, disposed between the concentric rings, each having an annular concave surface facing an adjacent portion of the exterior surface; a frustum interconnecting one of the dome to the innermost trough and the innermost trough to the innermost ring; and further frustum(s) each interconnecting one of the rings to the next outer trough and next outer trough to the next outer ring, the outermost ring joining integrally the container wall surrounding the handgrip, the handgrip having a thickness approximately equal to the wall thickness wherein the handgrip does not extend radially outwardly from the wall.

Additionally frustums may be provided to interconnect domes, rings and troughs not otherwise so provided.

The troughs preferably increase in diameter from the dome to the wall of the container and the troughs and frustums increasingly extend further into the container relative to the wall, from the outermost trough and frustum to the dome.

Also according to the invention there is provided a plastics container for liquids under pressure having at least one handgrip, formed in a wall of the plastics container, the wall defining an interior of the container, an interior surface, an exterior surface and a wall thickness, the handgrip comprising an integral structure formed of a central dome having a convex surface facing an adjacent portion of the exterior surface, at least two concentric rings each having an annular concave surface facing the interior, at least two annular troughs, disposed between the concentric rings, each having an annular concave surface facing an adjacent portion of the exterior surface; a frustum interconnecting one of the dome to the innermost trough and the innermost trough to the innermost ring; and further frustum(s) each interconnecting one of the rings to the next outer trough and next outer trough to the next outer ring, the outermost ring joining integrally the container wall surrounding the handgrip, the handgrip having a thickness approximately equal to the wall thickness wherein the handgrip does not extend radially outwardly from the wall.

In addition, according to the invention there is provided a blow mold for blow molding a plastics container for liquids under pressure having at least one handgrip formed in a wall defining an interior of the plastics container and having, an interior surface, exterior surface and a wall thickness, the handgrip comprising an integral structure formed of a central dome having a convex surface facing an adjacent portion of the exterior surface, at least two concentric rings each having an annular concave surface facing the interior, at least two annular troughs, disposed between the concentric rings, each having an annular concave surface facing an adjacent portion of the exterior surface; a frustum interconnecting one of the dome to the innermost trough and the innermost trough to the innermost ring; and further frustum(s) each interconnecting one of the rings to the next outer trough and next outer trough to the next outer ring, the outermost ring joining integrally the container wall surrounding the handgrip, the handgrip having a thickness approximately equal to the wall thickness wherein the handgrip does not extend radially outwardly from the wall.

The invention also provides a method of producing a handgrip, in a plastics container for pressurized liquids, which does not, in use, extend outwardly from the outer surface of the container, comprises:

a) providing a blow mold having an axis and handgrip forming features in the form of at least two concentric annular projections, to form a handgrip, extending toward the axis of the mold cavity and container to be formed, each annular projection having an outer extremity and adjacent side surface complimentary to a trough and a frustum;

b) pre-heating a preform to facilitate blow molding to form the container and the handgrip;

c) introducing the preform into the blow mold;

d) applying a gas at a pressure sufficient to inflate and deform the preform into contact with the mold cavity to form the container and into contact with handgrip forming features to produce the handgrip in a wall of the container, the handgrip being formed failing to contact the mold cavity in the region of a central dome and a substantial portion of trough connecting rings of the handgrip;

e) cooling the container; and f) removing the container with the handgrip(s) formed therein from the blow mold cavity.

BRIEF DESCRIPTION OF THE DRAWINGS

The invention will now be described, by way of example, with reference to the accompanying drawings, in which:

FIG. 1 is a cross-section of a handgrip of a first embodiment of the present invention;

FIG. 1A is a large cross-section of the fourth outer frustum;

FIG. 1B is an enlarge cross-section of the first outer frustum;

FIG. 2 is a fragmentary elevation of the handgrip of FIG. 1 with solid lines used to clarify the boundaries of structural elements of the handgrip;

FIG. 11 is a block diagram illustrating the method of the present invention.

DETAILED DESCRIPTION OF THE INVENTION

Figure 3:
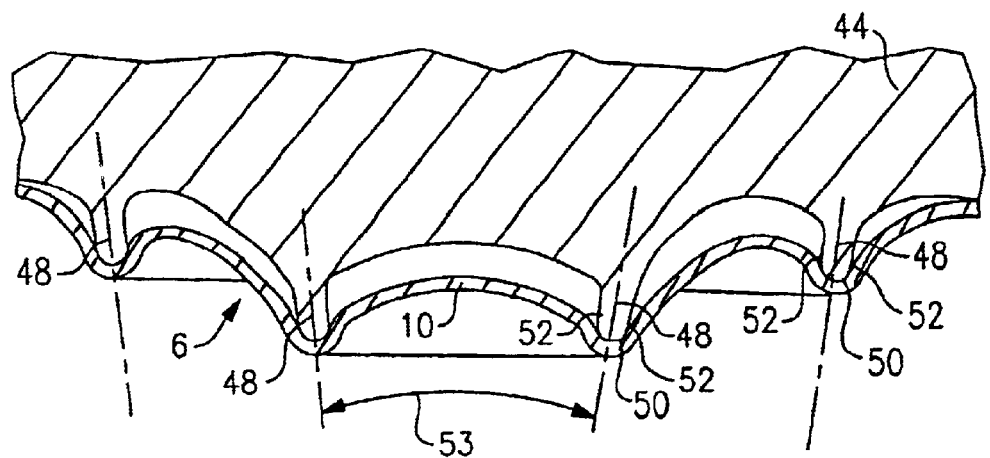
FIG. 3 is a cross-section of the handgrip of FIG. 1 and of a portion of a blow mold for producing this handgrip.

Referring first to FIGS. 1 and 2, a handgrip 6 of the first embodiment, formed in the wall 8 of a container, the wall 8 having an interior 14, an interior wall, and a exterior wall and a wall thickness 9A and a radius 11. The container is blow molded from a conventional preform of PET, and the handgrip 6 is an integral structure with wall 8 and is composed of a circular central dome 10 having a wall thickness 9B and that is smoothly connected to a first inner frustum 16 increasing in diameter to a first annular trough 18.

Trough 18 is, in turn, smoothly connected to a first outer frustum 20 that is generally the same as wall thickness 9A increasing in diameter to a connecting ring 22 smoothly interconnecting the first outer frustum 20 to a second annular trough 19 by way of a second inner frustum 21 increasing in diameter to trough 19.

Trough 19 is, in turn, smoothly connected to a second outer frustum 23 increasing in diameter to a connecting ring 22 smoothly interconnecting the second annular trough 19 to a third annular trough 25 by way of a third inner frustum 27 increasing in diameter to trough 25.

Trough 25 is, in turn, smoothly connected to a third outer frustum 29 increasing in diameter to a connecting ring 22 smoothly interconnecting the third annular trough 25 to a fourth annular trough 31 by way of a fourth inner frustum 33 increasing in diameter to trough 31.

Trough 31 is, in turn, smoothly connected to a fourth outer frustum 35 increasing diameter to an annular outer connecting ring 22 smoothly interconnecting the fourth outer frustum 35 to the wall 8 of the container.

The troughs 18, 19, 25, 31 and frustums 16, 20, 21, 23, 27, 29, 33, 35 increase in diameter from the dome 10 starting with the trough 18 and frustum 16. In addition, the troughs and frustums increasingly extend further into the container, relative to the wall 8, from the outermost trough 31 and frustum 35 to the dome 10.

The central dome 10 has a convex outer surface extending toward the adjacent outer surface 12 of the container wall 8 and a concave surface parallel to the convex surface and facing the interior 14 of the container.

The following dimensions are without a pressurized interior of the container and without the container being exposed to an elevated temperature substantially above ambient room temperature. In addition, the following dimensions relate to a handgrip formed in a container having a radius in the range of about 1.1 inches to about 1.6 inches, preferably about 1.3 inches. A typical central dome 10 has a radius 24 of the concave surface in a range of from about 0.19 inch to about 0.32 inch, preferably about 0.23 inch, a diameter of about 0.25 of an inch, a radial spacing 26 from the outer extremity of the convex surface to the outer surface of the wall 8 of the container in a range of about 0.01 of an inch to about 0.03 of an inch, preferably about 0.013 of an inch and a thickness 9B approximately equal to the wall 8 thickness 9A of the container, for example, of about 0.013 inch. Wall thicknesses are preferably in a range from about 0.010 of an inch to about 0.015 of an inch, but should not be construed as being limited to this range.

A typical inner frustum 16, 21, 27, 33 has a length 30 in cross-section in a range of about 0.003 of an inch to about 0.05 of an inch and preferably has a length of at least 0.005 of an inch and a thickness approximately equal to the thickness 9A of the wall 8. Although the presence of the inner frustum 16 is preferred and enhances the stability of the handgrip 6, this feature may be omitted, with the central dome then directly and smoothly joining trough 18, without departing from the concepts of the present invention.

The annular troughs 18, 19, 25, 31 typically have diameters of about 1, 1.6, 2.2 and 3 inches respectively and an internal radius 34 in cross-section in a range of from about 0.005 of an inch to about 0.05 of an inch with a preferred radius of about 0.015 of an inch. The thickness 36 of the trough walls in cross-section is approximately equal to the thickness 9A of the wall 8. The radial spacing of the inner surface (the surface facing the exterior surface of the container) of the troughs 18, 19, 25, 31 from the outer surface of wall 8 are about ¼, ½, ¾ and 1 of an inch each step of an increase in this dimension being variable by +/−⅛ inch.

A typical connecting ring 22 has a radius 40 in cross-section in a range of from about 0.09 of an inch to about 0.13 of an inch, preferably about 0.11 of an inch and a wall thickness in cross-section approximately equal to the wall thickness 9A of wall 8.

The diameter 42 of the handgrip 6 is preferably in a range of from about 1.5 inches to about 4 inches preferably about 2.750 inches. The above dimensions are chosen to allow formation of a handgrip 6 having a diameter at or close to the maximum diameter of 4 inches.

It will be appreciated that the choice of actual dimensions for the features of the handgrip 6 will be chosen to produce smooth transitions to between the various elements (dome, troughs, frustums, connecting rings and container wall) making up the handgrip 6 and to the wall 8.

Now referring to FIG. 3 a fragmentary portion of a blow mold 44 illustrates the blow mold features which form a handgrip 6 during a blow molding of a convention PET preform into a container. The fragmentary portion of the blow mold is a cross-section taken normal to the longitudinal axis 46 of the blow mold and the container. The blow mold features include an annular projections 48 (one for each trough) (two only being shown) each terminating at its outer extremity 50 in a radius in cross-section to form the internal radius of the associated trough and providing side surfaces 52 to form the inner and outer frustums associated with that trough. The annular projections decrease in diameter toward the outer extremities 50 with an included angle 53 of approximately 10°.

The provision of this inwardly decreasing diameter of the projections 48 facilitates the formation of the troughs and frustums and eases removal of the container with formed handgrip(s) from the blow mold.

It is to be noted that the blow molding is achieved by applying a pressure sufficient (about 600 p.s.i. or greater) to the interior of a conventionally pre-heated preform to inflate and deform the preform into engagement with the blow mold and its handgrip forming features. However, it should also be noted that while the cylindrical wall 8 of the container intimately contacts the wall forming portion of the blow mold the handgrip 6, being formed, contacts only the outer extremities 50 and the side surfaces 52 adjacent these outer extremities.

Figure 5:
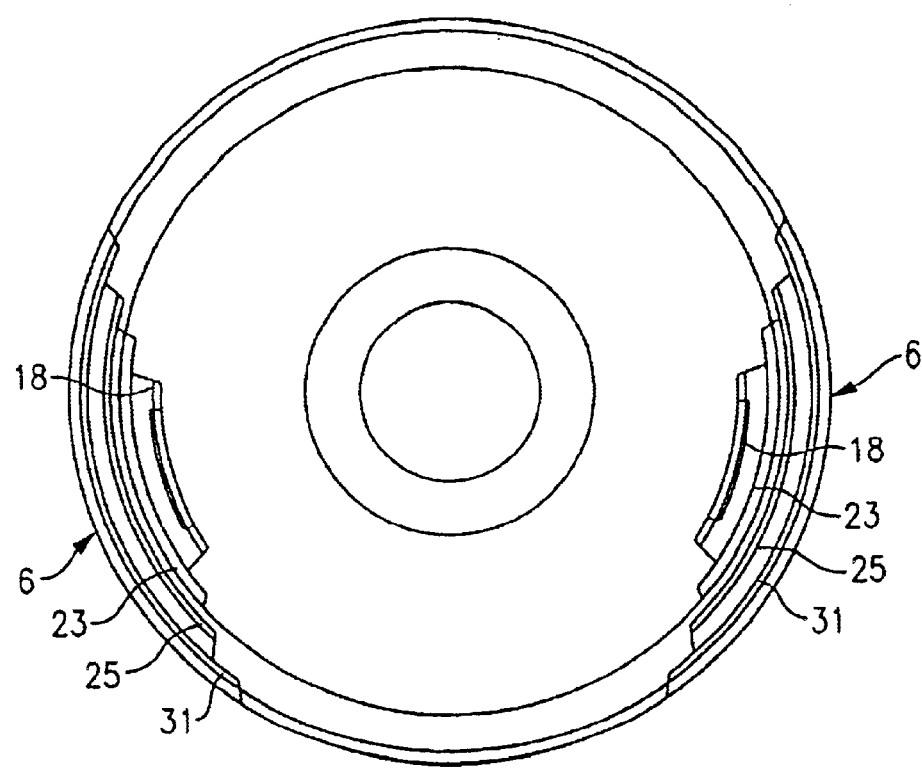
FIG. 5 is a cross-section of a plastics container incorporating two handgrips taken on section 5—5 of FIG. 4.
Figure 4:
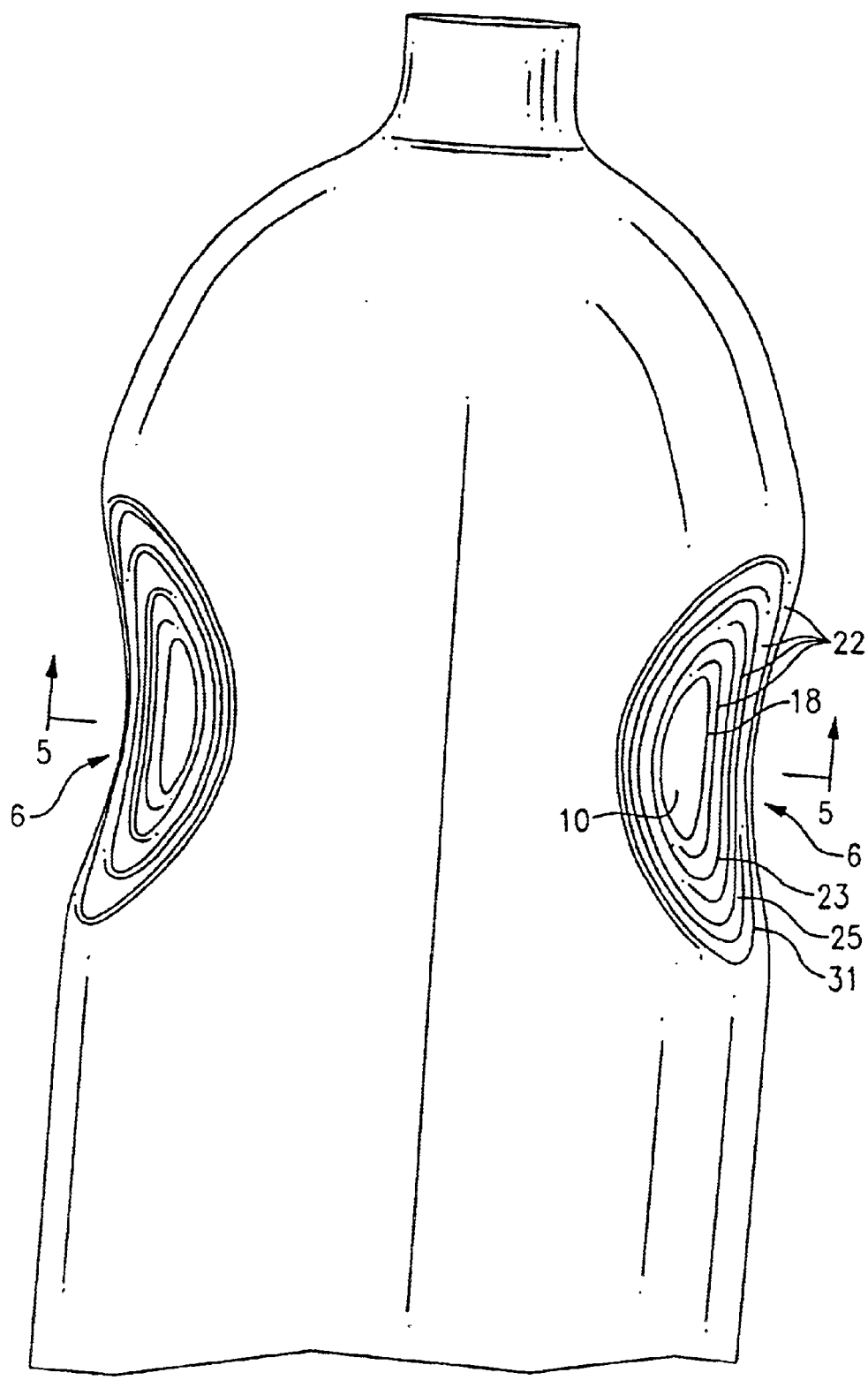
FIG. 4 is a partial elevation of a plastics container for carbonated beverages having handgrips of the present invention.

FIGS. 4 and 5 illustrates two handgrips disposed offset (see FIG. 5) relative to the axis 46 of the container to facilitate the gripping of larger (e.g. 3 liter) containers of liquids under pressure.

Figure 6:
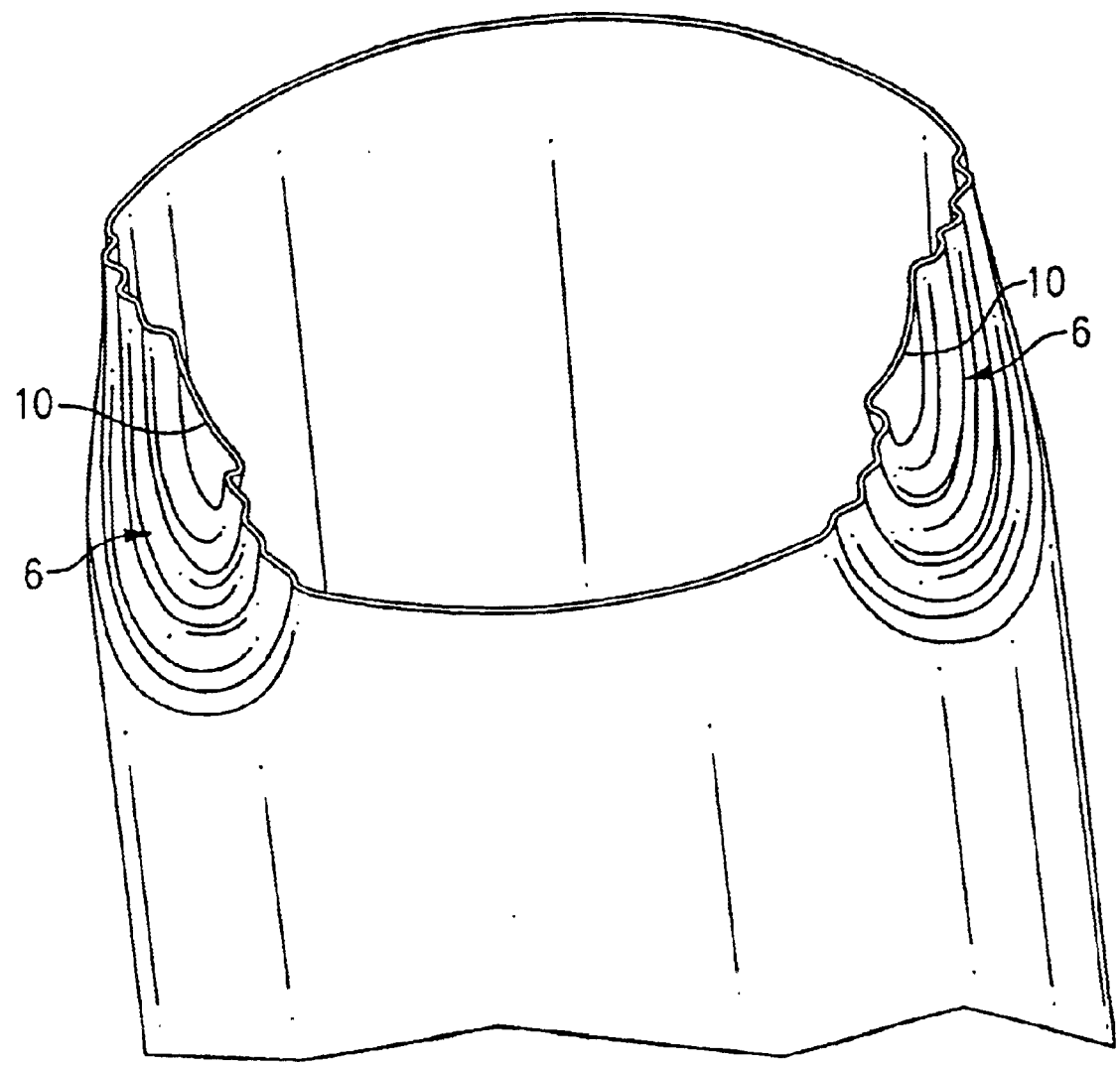
FIG. 6 is an angled cross-section similar to that of FIG. 5 showing a fragmentary portion of the plastics container.
Figure 8:
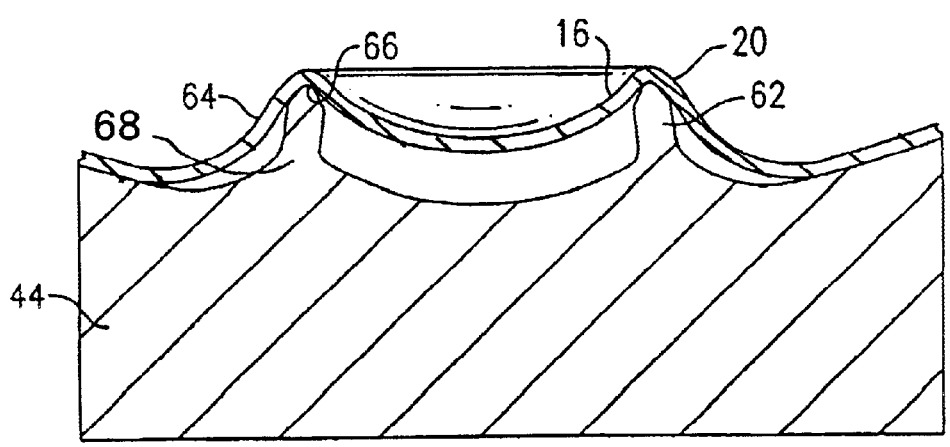
FIG. 8 is a fragmentary cross-section of a handgrip of a second embodiment of the present invention and a portion of a blow mold for producing this handgrip.

In FIG. 6 the container illustrated in FIGS. 4 and 8 has be sectioned at an angle to clearly illustrate a cross-section of the handgrips thereof.

As previously mentioned the handgrips do not extend outwardly of the container and are preferable recessed relative to the outer surface of the wall 8 (and shoulder 56) even when the container filled with a carbonated beverage or other pressurized liquid is subjected to elevated temperatures and mechanical stresses in accordance with industry standards.

Figure 7:
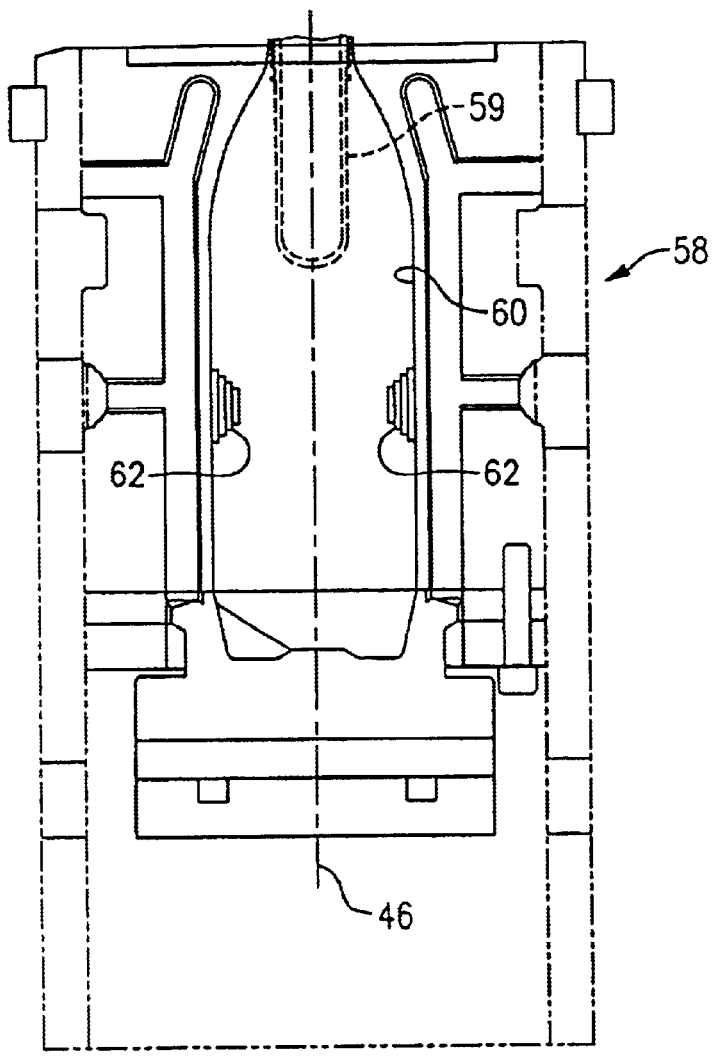
FIG. 7 is a longitudinal cross-section of a blow mold for producing the container of FIG. 4.

FIG. 7 is a cross-section of a blow mold 58 having a blow mold cavity 60 defining handgrip forming features 62, as illustrated in FIG. 4, for producing the container of FIGS. 4, 5 and 6 with two handgrips 6.

FIG. 8 illustrates a second embodiment of a trough, of the present invention, when replaced by a trough 66 having a very small radius or a nonexistent internal surface joining the frustums 16 and 20. The portion 44 of the blow mold shown in FIG. 8 has an annular projection 68 having an outer extremity which is complimentary to the form of the trough 66. Only one projection 68 is shown in FIG. 8 although it will be appreciated that as with FIG. 3 the number of projections will be equal to the number of troughs.

Figure 9:
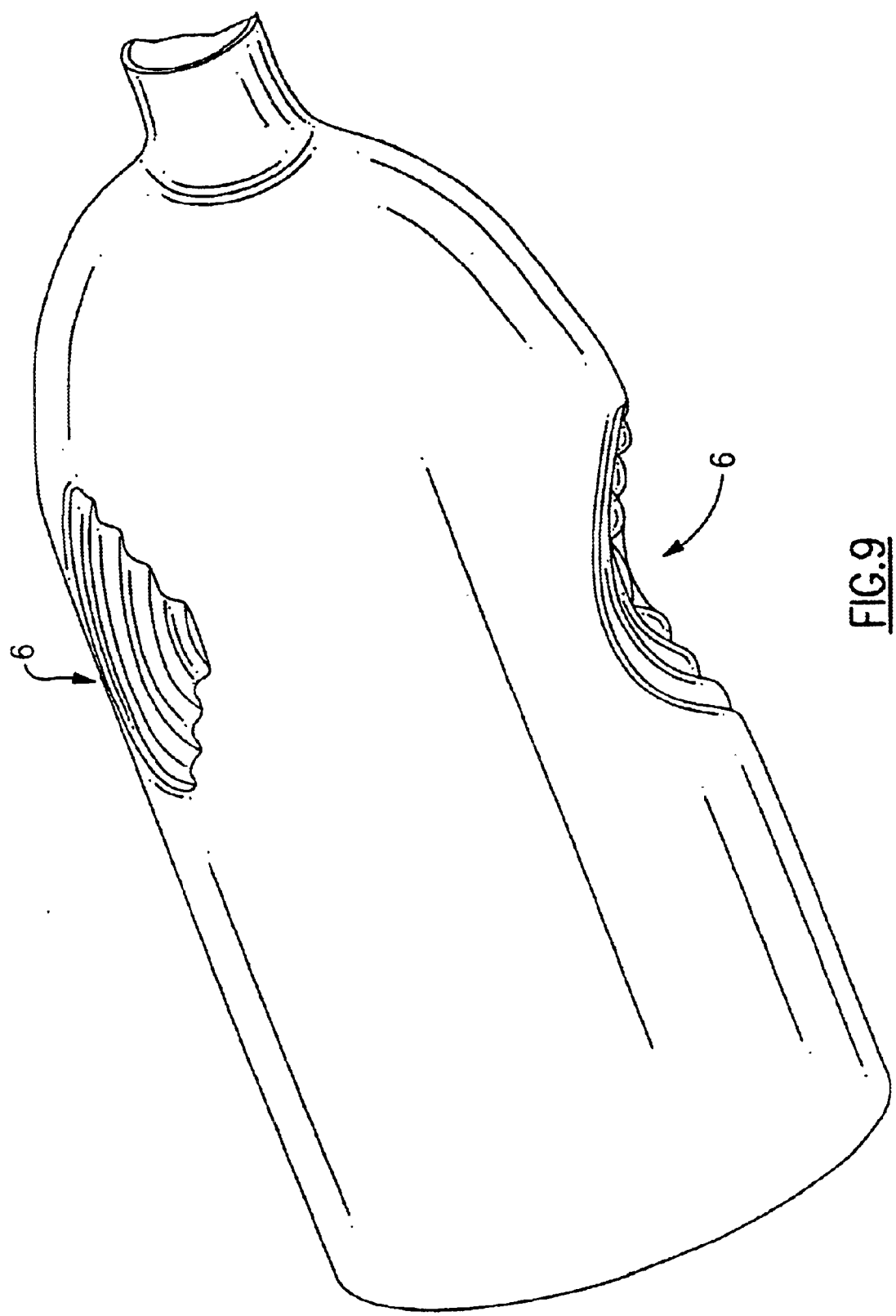
FIGS. 9 and 10 illustrate alternative designs of handgrips to that shown in FIG. 4.

FIG. 9 illustrates a variation of handgrips according to the present invention in which each handgrip is of a teardrop shape (see definition of circular above).

Figure 10:
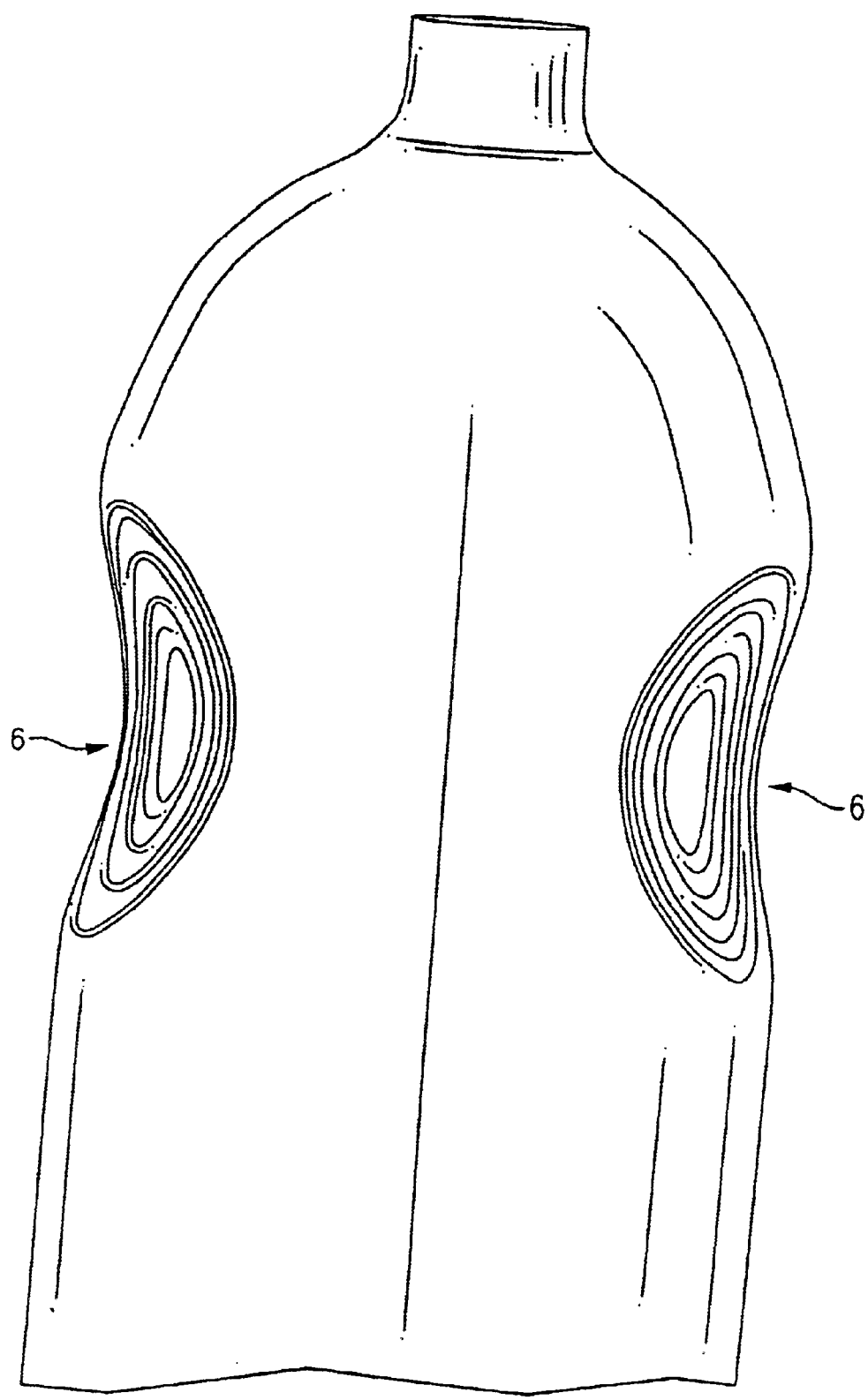

FIG. 10 illustrates a further variation of handgrips according to the present invention in which the central dome has a plurality of parallel deformations or ridges and valleys to provide additional rigidity to the dome and thus the handgrip.

FIG. 11 illustrates the method of the present invention to produce a handgrips, in the wall of a container for pressurized liquids (e.g. a carbonated beverage), which does/do not, even under acceptable elevated temperatures and mechanical stresses acceptable to the industry (i.e. the carbonated beverage industry), does not distort or extend outwardly from the outer surface of the container, comprises:

a) providing a blow mold having handgrip forming features (to form at least two handgrips) in the form of at least two annular projections extending toward the axis 46 of the mold cavity and container to be formed, the annular projection(s) having an outer extremity and adjacent side surfaces complimentary to the troughs and frustums respectively of the handgrips;

b) pre-heating a preform to facilitate blow molding to form the container and handgrips;

c) introducing the preform into the blow mold;

d) applying a gas at a pressure sufficient to inflate and deform the preform into contact with the mold cavity to form the container and into contact with the complimentary features to produce the handgrips in the wall thereof, the handgrips being formed-failing to contact the mold cavity in the region of the/their central dome(s) 10 and a substantial portion of the connecting rings 22;

e) cooling the container; and handgrips; and f) removing the container with handgrips formed therein from the blow mold cavity.

It will be appreciated that in some circumstances a single handgrip may be utilized.

| Reference numerals | |
|---|---|
| 6 | handgrip |
| 8 | wall |
| 9A | wall thickness |
| 9B | central dome thickness |
| 10 | dome |
| 11 | container radius |
| 12 | outer surface |
| 14 | interior |
| 16 | first inner frustum |
| 18 | first annular trough |
| 19 | second annular trough |
| 20 | first outer frustum |
| 21 | second inner frustum |
| 22 | connecting ring |
| 23 | second outer frustum |
| 24 | radius of central dome |
| 25 | third annular trough |
| 26 | radial spacing |
| 27 | third inner frustum |
| 29 | third outer frustum |
| 30 | inner and outer frustum length |
| 31 | fourth annular trough |
| 33 | fourth inner frustum |
| 34 | trough internal radius |
| 35 | fourth outer frustum |
| 36 | trough thickness |
| 38 | included angle of straight portions |
| 40 | connecting ring radius |
| 42 | handgrip diameter |
| 44 | blow mold |
| 46 | axis |
| 48 | annular projection |
| 50 | outer extremity |
| 52 | side surfaces |
| 53 | including angle |
| 54 | container |
| 56 | shoulder |
| 58 | blow mold |
| 59 | preform |
| 60 | cavity |
| 62 | handgrip forming features |
| 64 | handgrip |
| 66 | trough |
| 68 | annular projection |

What is claimed is:

1. A handgrip formed in a container wall of a plastics container, the container wall defining an interior of the container, an interior surface of the container, an exterior surface of the container and a wall thickness and the container being suitable for containing a liquid under pressure, the handgrip comprising:
 a structure integral with the wall of the container and recessed with respect to the exterior surface of the container, the handgrip including a central dome having a convex surface extending toward the exterior surface of the container,
 at least an innermost concentric connecting ring and an outermost concentric connecting ring, with each connecting ring having an annular concave surface facing the interior of the container,
 at least an innermost annular trough and an outermost annular trough, each annular trough having an annular concave surface facing an adjacent portion of the exterior surface of the container,
 a first inner frustum interconnecting the dome to the innermost trough,
 a first outer frustum connecting the innermost trough to the innermost connecting ring,
 another outer frustum connecting the outermost annular trough with the outer most connecting ring,
 the outermost connecting ring joining integrally with the container wall surrounding the handgrip, and
 the handgrip in the container wall having a thickness approximately equal to the container wall thickness surrounding the handgrip.

2. The handgrip of claim 1 wherein at least one other inner frustum connects the inner most connecting ring with the outermost annular trough.

3. The handgrip of claim 1 wherein each outer frustum has a straight longitudinal dimension in a range of from about 0.003 of an inch to about 0.05 of an inch.

4. The handgrip of claim 3 wherein the longitudinal dimension is at least about 0.005 of an inch.

5. The handgrip of claim 2 wherein each inner frustum has a straight longitudinal dimension in a range of from about 0.003 of an inch to about 0.05 of an inch.

6. The handgrip of claim 5 wherein the longitudinal dimension is at least about 0.005 of an inch.

7. The handgrip of claim 1 wherein the concave cross-section of each trough defines a cross-sectional surface having a radius of from about 0.005 of an inch to about 0.05 of an inch.

8. The handgrip of claim 7 wherein the radius is about 0.015 of an inch.

9. A handgrip formed in of claim 1 wherein a minimum radial spacing between the central dome and the adjacent exterior surface is about 0.013 of an inch.

10. The handgrip of claim 1 wherein the concave surface of each connecting ring has a radius in cross-section from about 0.09 of an inch to about 0.13 of an inch.

11. The handgrip of claim 1 wherein at least two other intermediate inner frustums, at least one other intermediate connecting ring and at least one other intermediate annular trough connects the inner most connecting ring with the outermost annular trough.

12. The handgrip of claim 11 wherein the central dome, each inner frustum, each outer frustum, each connecting ring and the container wall all smoothly blend together to form a substantially constant thickness wall.

13. The handgrip of claim 11 wherein the troughs increase in diameter from the dome to the wall of the container and the troughs and inner and outer frustums increasingly extend further into the container relative to the wall, from the outermost connecting ring to the dome.

14. The handgrip of claim 1 wherein the central dome, the troughs, the outer frustums, the inner frustum, the connecting rings and the container wall smoothly blend together to form a substantially constant thickness wall.

15. The handgrip of claim 1 wherein the troughs increase in diameter from the dome to the wall of the container and the troughs and the inner and outer frustums increasingly extend further into the container relative to the wall, from the outermost connecting ring to the dome.

16. The handgrip a container wall of a plastics container the container wall defining an interior of the container, an interior surface of the container, an exterior surface of the container and a wall thickness and the container being suitable for containing a liquid under pressure, the handgrip comprising:
 a structure integral with the wall of the container and recessed with respect to the exterior surface of the container, the handgrip including a central dome having a convex surface extending toward the exterior surface of the container;
 at least an innermost concentric connecting ring and an outermost concentric connecting ring, with each connecting ring having an annular concave surface facing the interior of the container;

at least an innermost annular trough and an outermost annular trough, each annular trough having an annular concave surface facing an adjacent portion of the exterior surface of the container;

a first inner frustum interconnecting the dome to the innermost trough;

a first outer frustum connecting the innermost trough to the innermost connecting ring;

another outer frustum connecting the outermost annular trough with the outer most connecting ring;

the outermost connecting ring joining integrally with the container wall surrounding the handgrip;

the handgrip in the container wall having a thickness approximately equal to the container wall thickness surrounding the handgrip; and the central dome has an inner surface concave to said interior of the container and has a radius of about 0.19 of an inch to about 0.32 of an inch.

17. A plastics container for liquids under pressure having at least one handgrip formed in a wall of the plastics container, the handgrip having the wall defining an interior of the container, an interior surface, an exterior surface and a wall thickness, the handgrip comprising an integral structure formed of a central dome having a convex surface facing an adjacent portion of the exterior surface, at least two concentric connecting rings each having an annular concave surface facing the interior of the container, at least innermost and outermost annular troughs, disposed between the concentric connecting rings, each annular trough having an annular concave surface facing an adjacent portion of the exterior surface; an inner frustum interconnecting the dome to the innermost trough and an outer frustum interconnecting the innermost trough to the innermost connecting ring, another outer frustum connecting the outermost annular trough with the outer most connecting ring, the outermost connecting ring joining integrally with the container wall surrounding the handgrip, and the handgrip in the container wall having a thickness approximately equal to the container wall thickness surrounding the handgrip.

18. The container of claim 17 wherein the central dome is connected to the innermost trough and each connecting ring is connected to the next outward trough by way of an inner frustum.

19. A blow mold for blow molding a plastics container having at least one handgrip formed in a container wall, the container wall defining an interior of the plastics container and having; an interior surface, an exterior surface and a wall thickness, the blow mold comprising:

a body having a mold wall for forming an interior cavity shaped to the exterior shape of the container and having an opening for receiving a plastic pre-mold to be molded into the container, and at least one inwardly extending portion of the mold wall shaped as a negative impression of a handgrip to be formed in the container wall, the handgrip extending inwardly from the container wall, and wherein a positive impression of the handgrip includes
a central dome having a convex surface extending toward the exterior surface of the container,
at least two concentric connecting rings, each connecting ring having an annular concave surface facing the interior of the container,
at least one innermost annular trough and one outermost annular trough disposed between the concentric connecting rings, each trough having an annular concave surface facing an adjacent portion of the exterior surface of the container,
a first inner frustum interconnecting the dome to the innermost trough,
a first outer frustum connecting the innermost trough to the innermost connecting ring,
another outer frustum connecting the outermost annular trough with the outer most connecting ring,
the outermost connecting ring joining integrally with the container wall surrounding the handgrip, and
the handgrip in the container wall having a thickness approximately equal to the container wall thickness surrounding the handgrip.

20. The blow mold of claim 19 wherein in the positive impression of the handgrip the central dome is connected to the innermost trough and each connecting ring is connected to an adjacent outward trough by way of an inner frustum.

21. The blow mold of claim 20 wherein the inwardly extending portion of the blow mold comprising annular projections, each having an outer extremity and adjacent side surfaces complimentary to the outer and inner frustums.

22. The blow mold of claim 19 wherein the inwardly extending portion of the blow mold further comprising annular projections, each having an outer extremity and an adjacent side surface complimentary to the trough and outer frustum.

23. The blow mold for blow molding a plastic container of claim 19, wherein:

the negative impression of a handgrip includes an inwardly extending annular projection corresponding to each trough, each annular projection including an inwardly extending body having a body having side surfaces forming an inner and an outer frustum associated with the corresponding trough and terminating in a cross section radius forming an internal radius of the corresponding trough.

24. The blow mold for blow molding a plastic container of claim 23, wherein:

a cross section diameter of the annular projection decreases toward the terminating cross section radius so that the body and the terminating cross section radius of the annular projection are slanted toward a centerline of the handgrip by an included angle of approximately 10 degrees.

* * * * *